(12) United States Patent
Bercovici et al.

(10) Patent No.: US 10,334,473 B2
(45) Date of Patent: Jun. 25, 2019

(54) SYSTEMS AND METHODS FOR REDUCING RADIOFREQUENCY INTERFERENCE IN A MOBILE COMMUNICATIONS DEVICE

(71) Applicant: MOTOROLA SOLUTIONS, INC., Schaumburg, IL (US)

(72) Inventors: Mihael S. Bercovici, Shoham (IL); Eitan Koren, Raanana (IL); Aya Korine, Netanya (IL); Simona Lisker, Reshon Letzion (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 50 days.

(21) Appl. No.: 14/969,586

(22) Filed: Dec. 15, 2015

(65) Prior Publication Data
US 2017/0171774 A1 Jun. 15, 2017

(51) Int. Cl.
| | |
|---|---|
| *H04B 1/10* | (2006.01) |
| *H04W 28/04* | (2009.01) |
| *H04W 36/06* | (2009.01) |
| *H04W 16/14* | (2009.01) |
| *H04W 88/06* | (2009.01) |

(52) U.S. Cl.
CPC .......... *H04W 28/04* (2013.01); *H04B 1/1027* (2013.01); *H04W 16/14* (2013.01); *H04W 36/06* (2013.01); *H04W 88/06* (2013.01)

(58) Field of Classification Search
CPC ... H04W 28/048; H04W 68/00; H04W 84/02; H04W 88/02; H04W 72/082; H04W 72/1215; H04B 1/1027

USPC .......................................................... 455/425
See application file for complete search history.

(56) References Cited

U.S. PATENT DOCUMENTS

| | | | | |
|---|---|---|---|---|
| 2008/0108338 | A1* | 5/2008 | Herrero Veron | H04W 4/16 455/414.3 |
| 2009/0247218 | A1* | 10/2009 | Lee | H04W 16/14 455/553.1 |
| 2012/0252470 | A1* | 10/2012 | Wong | H04W 72/048 455/450 |
| 2013/0122811 | A1* | 5/2013 | Scribano | H04W 16/14 455/41.2 |
| 2013/0303214 | A1* | 11/2013 | Ahmadi | H04W 72/1215 455/501 |
| 2015/0148088 | A1* | 5/2015 | Ericson | H04B 15/00 455/501 |

(Continued)

*Primary Examiner* — Marcus Hammonds
(74) *Attorney, Agent, or Firm* — Michael Best & Friedrich LLP

(57) ABSTRACT

A method for reducing radiofrequency interference in a mobile communications device. The method includes receiving, by a first mobile communications device, a frequency message including a frequency band of a second mobile communications device. The method further includes determining, by an electronic processor of the first mobile communications device, whether the frequency band of the second mobile communications device conflicts with an operating frequency band of the first mobile communications device. The method further includes generating, by the electronic processor, an interference message, including a proposed mitigation action, when the frequency band conflicts with the operating frequency band. The frequency band and the operating frequency band each may be a long-term evolution frequency band or a land-mobile radio frequency band.

14 Claims, 3 Drawing Sheets

(56) References Cited

U.S. PATENT DOCUMENTS

2016/0212594 A1* 7/2016 Morita .................. H04W 72/10

* cited by examiner

SYSTEMS AND METHODS FOR REDUCING RADIOFREQUENCY INTERFERENCE IN A MOBILE COMMUNICATIONS DEVICE

BACKGROUND OF THE INVENTION

Different wireless communications devices may operate using proximate frequency bands. For example, mobile communications devices implementing the land-mobile radio (LMR) protocol and mobile communications devices implementing the long-term evolution (LTE) protocol may all operate in the 700 MHz and 800 MHz frequency ranges. Increasingly, mobile communications devices operating in different networks, but in the same frequency range, are operated proximate to one another. For example, a police officer using a portable two-way radio operating on a land-mobile radio network may also access data applications using a smart telephone that operates on a long-term evolution network. When the two mobile communications devices are configured to operate in proximate frequency bands, radiofrequency interference may occur, disrupting the operation of one or both of the devices. In some cases, one or both of the devices may be unable to connect to their respective networks, but the police officer may not discover this until he or she attempts to use the devices.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
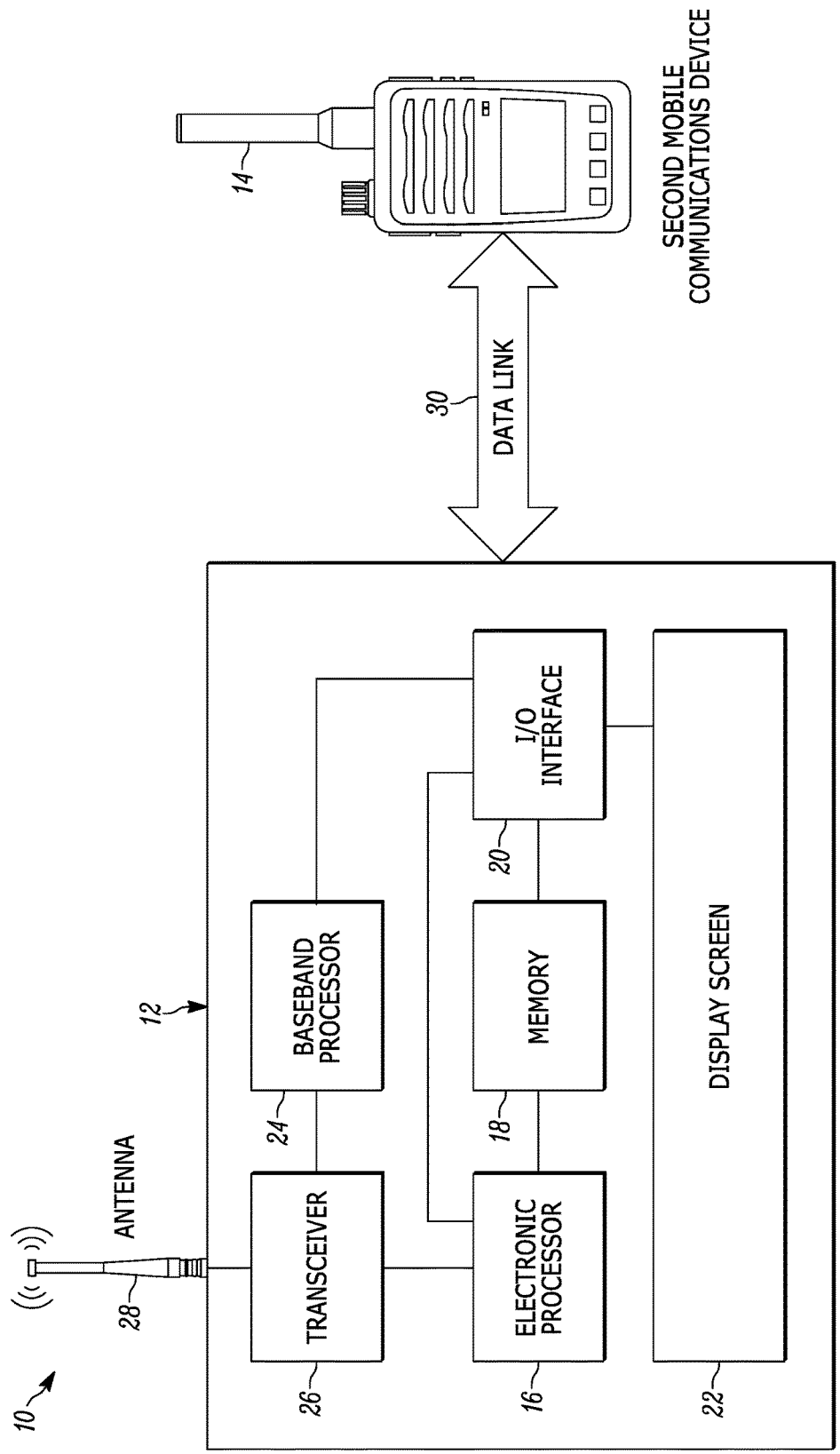
FIG. 1 is a block diagram of communications system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One exemplary embodiment provides a method for reducing radiofrequency interference in a mobile communications device. The method includes receiving, by a first mobile communications device, a frequency message including a frequency band of a second mobile communications device. The method further includes determining, by an electronic processor of the first mobile communications device, whether the frequency band of the second mobile communications device conflicts with an operating frequency band of the first mobile communications device. The method further includes generating, by the electronic processor of the first mobile communications device, an interference message, including a proposed mitigation action, when the frequency band of the second mobile communications device conflicts with the operating frequency band of the first mobile communications device. The frequency band and the operating frequency band each may be a long-term evolution frequency band or a land-mobile radio frequency band.

In another exemplary embodiment, the method further includes displaying, on a screen of the first mobile communications device, the interference message. The method further includes receiving, by the electronic processor of the first mobile communications device, an input in response to the interference message. The method further includes issuing, by the electronic processor of the first mobile communications device, a command to a transceiver of the first mobile communications device based on the proposed mitigation action and the input.

Another exemplary embodiment provides a mobile communications device. The device includes a transceiver having an operating frequency band and an electronic processor electrically coupled to the transceiver. The electronic processor is configured to receive a frequency message including a frequency band of a second mobile communications device. The electronic processor is further configured to determine whether the frequency band of the second mobile communications device conflicts with the operating frequency band. The electronic processor is further configured to generate an interference message, including a proposed mitigation action, when the frequency band of the second mobile communications device conflicts with the operating frequency band. The frequency band and the operating frequency band each may be a long-term evolution frequency band or a land-mobile radio frequency band.

FIG. 1 is a block diagram of one exemplary embodiment of a communications system 10 for providing wireless communication. The communications system 10 includes a first mobile communications device 12, and a second mobile communications device 14. In a number of the embodiments described herein, the first mobile communications device 12 is a smart telephone and the second mobile communications device 14 is a portable two-way radio. However, the systems and methods described herein are not limited to this configuration. In view of the description below, a person of ordinary skill in the art could implement embodiments of the invention in many different types of electronic devices such as, for example, cellular telephones, smart watches, tablet computers, personal digital assistants (PDAs), or other devices that include or are capable of being coupled to a network modem or components to enable wireless network communications.

In the example illustrated, the first mobile communications device 12 includes an electronic processor 16, a memory 18, an input/output (I/O) interface 20, a display screen 22, a baseband processor 24, a transceiver 26, and an antenna 28. For ease of description, the embodiment of the first mobile communications device 12 illustrated in FIG. 1 includes one of each of the foregoing components. Alternative embodiments may include more or fewer of each of these components, may combine some components, or may include other alternative components. For example, some embodiments include components that perform distinct functions, for example, a transmitter and a receiver, instead of, or in addition to, the transceiver 26. Other embodiments may include components, for example, a transmitter and a receiver (not shown) that operate to establish short-range wireless, Wi-Fi, or other wireless connections with other electronic devices or wireless data networks.

The electronic processor 16, the memory 18, the input/output interface 20, the baseband processor 24, the transceiver 26, and the antenna 28, as well as other various modules and components, are electrically coupled to each other by or through one or more control or data buses, which enable communication therebetween. The electronic processor 16 operates to control the other components of the first mobile communications device 12. The electronic processor 16 obtains and provides information (for example, from the memory 18 and/or the input/output interface 20), and processes the information by executing one or more software instructions or modules, capable of being stored, for example, in a random access memory ("RAM") area of the memory 18 (for example, during execution) or a read only memory ("ROM") of the memory 18 (for example, on a generally permanent basis) or another non-transitory computer readable medium. The software can include firmware, one or more applications, program data, filters, rules, one or more program modules, and other executable instructions. The electronic processor 16 retrieves from the memory 18 and executes, among other things, software related to the control processes and methods described herein.

The memory 18 can include one or more non-transitory computer-readable media, and includes a program storage area and a data storage area. The program storage area and the data storage area can include combinations of different types of memory, as described herein.

The input/output interface 20 operates to receive input from, for example, a user of the first mobile communications device 12, to provide system output, or a combination of both. The input/output interface 20 obtains information and signals from, and provides information and signals to, (for example, over one or more wired and/or wireless connections) devices both internal and external to the first mobile communications device 12. Input may be provided via, for example, a keypad, a microphone, soft keys, icons, or soft buttons on the display screen 22, a scroll ball, buttons, and the like. System output may be provided via the display screen 22. The display screen 22 is a suitable display device such as, for example, a liquid crystal display (LCD) touch screen, or an organic light-emitting diode (OLED) touch screen. The input/output interface 20 may include a graphical user interface (GUI) (for example, generated by the electronic processor 16, from instructions and data stored in the memory 18, and presented on the display screen 22) that enables a user to interact with the first mobile communications device 12. In alternative embodiments, the input/output interface 20 includes a push-to-talk (PTT) button for activating a two-way radio modem (not shown), which button may be implemented, for example, as a physical switch or by using a soft key or icon in the graphical user interface on the display screen 22.

The baseband processor 24 operates to encode and decode digital data sent and received by the transceiver 26. The electronic processor 16 controls the transceiver 26 to send and receive data to and from various wireless communications and data networks such as, for example, a long-term evolution cellular network (not shown), via the antenna 28.

In one exemplary embodiment, the first mobile communications device 12 is configured to perform a variety of functions, accessible via components including the input/output interface 20 and the display screen 22. The functions include, for example, running local or network-based applications ("apps"), providing access to remote data networks (for example, using the long-term evolution (LTE) protocol), and providing wireless voice communications using one or more modalities (for example, land-mobile or cellular).

The second mobile communications device 14 includes hardware and software that provide the capability for the second mobile communications device 14 to communicate wirelessly. In the illustrated embodiment, the portable communications device 14 is a portable two-way radio, for example, one of the Motorola® APX™ series of radios. In one exemplary embodiment, the second mobile communications device 14 operates to communicate wirelessly using, for example, a public safety land-mobile radio (LMR) network (not shown), which may be, for example, implemented in accordance with the Association of Public Safety Communications Officials (APCO) "Project 25" (P25) two-way radio communications protocol. In alternative embodiments, the second mobile communications device 14 may operate using other two-way radio communications protocols and standards.

As noted above, in alternative embodiments, the second mobile communications device 14 may be a cellular telephone, a smart telephone, or other electronic communications device.

In some embodiments, the first mobile communications device 12 and the second mobile communications device 14 operate to communicate with each other via a data link 30. In some embodiments, the data link 30 is a wired connection between the devices, such as, for example, a universal serial bus (USB) connection to a wired communications interface (not shown). In other embodiments, the data link 30 is a wireless connection established using, for example, a Wi-Fi, short-range wireless, or near field communication modality.

In alternative embodiments, the data link 30 may be established without a direct connection between the first mobile communications device 12 and the second mobile communications device 14. For example, in one alternative embodiment, the second mobile communications device 14 may operate to display encoded information (for example, a quick response (QR) code) on a screen (not shown), which information may be received using a camera or scanner (not shown) of the first mobile communications device 12. Similarly the first mobile communications device 12 may operate to display information on the display screen 22, which information may be received by the second mobile communications device 14.

The first mobile communications device 12 and the second mobile communications device 14 operate wirelessly within particular frequency bands, for example, in the 700 Mega Hertz (MHz) and 800 MHz frequency ranges. Therefore, it is possible for both the first mobile communications device 12 and the second mobile communications device 14 to operate in the proximate frequency bands (or the same frequency band) at the same time. For example, the first mobile communications device 12 may operate using the long-term evolution protocol in the 700 MHz long-term evolution frequency band, while the second mobile communications device 14 operates in the 700 MHz land-mobile radio frequency band. Although exemplary embodiments are described in terms of the 700 MHz and 800 MHz frequency ranges, the systems and methods described herein could be used to reduce radiofrequency interference with any frequency ranges.

As can be appreciated by one skilled in the art, when first mobile communications device 12 and the second mobile communications device 14 operate in the same frequency range and in physical proximity to one another, for example, in the same vehicle or on the same public safety utility belt, radiofrequency interference may result. As can be appreciated by one skilled in the art, the operating frequencies of the first mobile communications device 12 and the second mobile communications device 14 need not be exactly the same for interference to result. For example, the performance of a receiver of the second mobile communications device 14 may be diminished by effects caused by the transmissions of the first mobile communications device 12, such as, for example, intermodulation interference, out of band emissions, and radiofrequency saturation. When the radiofrequency interference is severe enough, the second mobile communications device 14 may not be able to connect to, or communicate with, its affiliated land-mobile radio network. According, using the methods described below, the first mobile communications device 12 and the second mobile communications device 14 operate to detect the potential for radiofrequency interference, and attempt to mitigate the interference.

Figure 2:
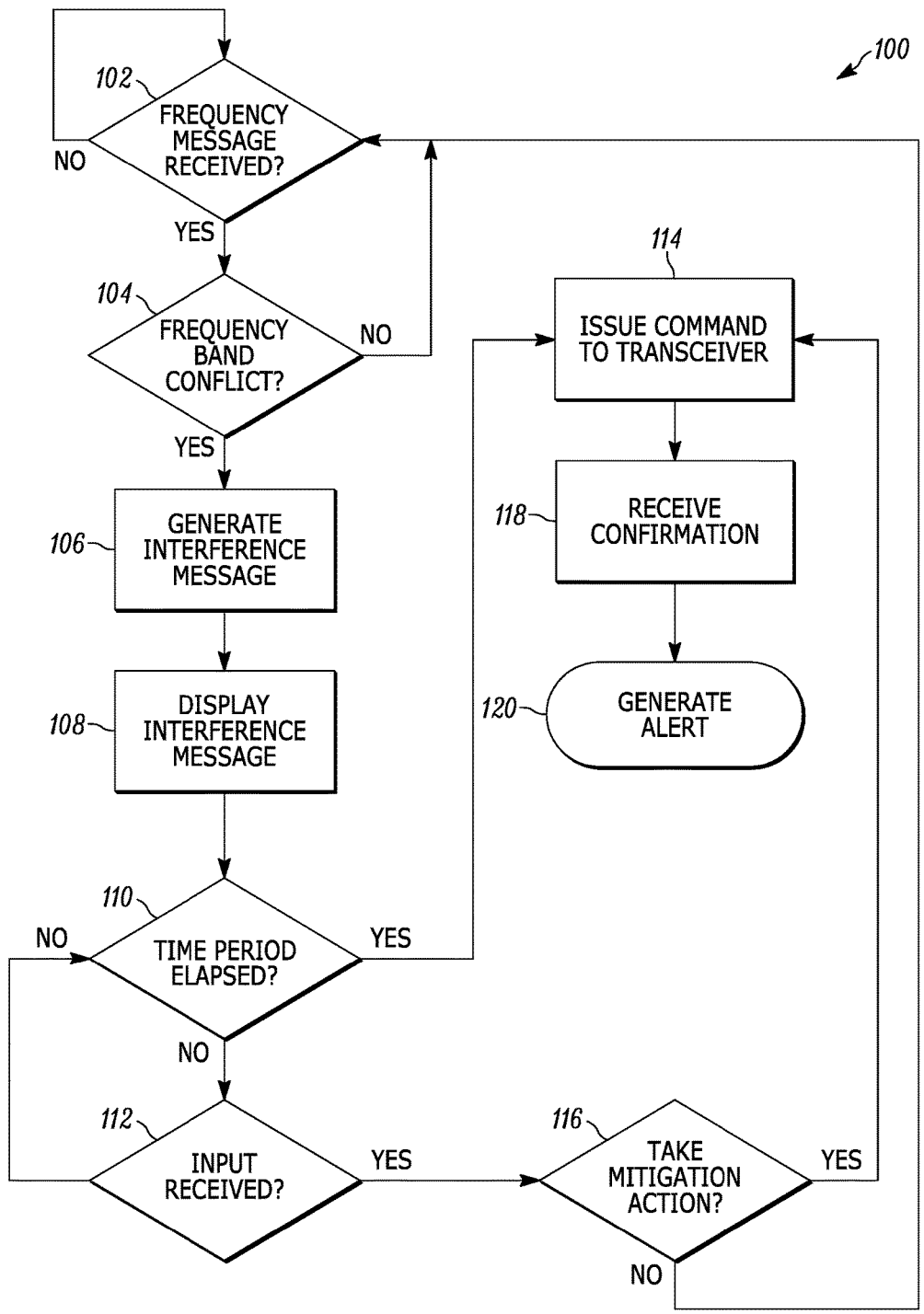
FIG. 2 is a flowchart of a method for reducing radiofrequency interference in a mobile communications device in accordance with some embodiments.

FIG. 2 illustrates an exemplary method 100 for reducing radiofrequency interference in a mobile communications device. As an example, the method 100 is described in terms of the first mobile communications device 12 being a smart telephone used by a law enforcement officer, and the second mobile communications device 14 being a portable two-way radio used by the same law enforcement officer. In this example, the first mobile communications device 12 operates using the long-term evolution wireless modality, and the second mobile communications device 14 operates using the land-mobile radio wireless modality. This should not be considered limiting; the concepts embodied in the example described may be applied to different scenarios, combinations of devices, and devices that operate according to different protocols or modalities than those explicitly explained. For example, the first mobile communications device 12 may be a portable two-way radio used by a first law enforcement officer, and the second mobile communications device 14 may be a smart telephone used by a second law enforcement officer working in the same vehicle as the first law enforcement officer (or in the same general vicinity).

At block 102, the first mobile communications device 12 checks for receipt of a frequency message from the second mobile communications device 14 via the data link 30. The frequency message includes at least information on the frequency band of the second mobile communications device 14 (for example, what land-mobile radio frequency band is in use). In some embodiments, the frequency message may also include other information such as, for example, a radiofrequency power level for a transmitter of the second mobile communications device 14, the wireless protocol that the second mobile communications device 14 is configured to use, and the like. When no frequency message is received, the first mobile communications device 12 continues to check for a frequency message, at block 102.

At block 104, when a frequency message is received, the electronic processor 16 uses the information in the frequency message to determine whether the frequency band of the second mobile communications device 14 conflicts with the operating frequency band of the first mobile communications device 12. For example, the electronic processor 16 may determine that frequency band of the second mobile communications device 14 conflicts with the operating frequency band of the first mobile communications device 12 when both the frequency band and the operating frequency band are within the 700 MHz band. In another example, the electronic processor 16 may determine that frequency band of the second mobile communications device 14 does not conflict with the operating frequency band of the first mobile communications device 12 when the frequency band is within the 700 MHz band and the operating frequency band is within the 800 MHz band.

When no conflict exists, the method begins again by checking for the receipt of a new frequency message at block 102. When a conflict exists, the electronic processor 16 generates an interference message at block 106. The interference message includes information that the frequency band of the second mobile communications device 14 conflicts with the operating frequency band of the first mobile communications device 12 and at least one proposed mitigation action.

A mitigation action includes an action that may be taken by the first mobile communications device 12 to mitigate potential radiofrequency interference with the second mobile communications device 14. One exemplary mitigation action includes the electronic processor 16 powering down a transmitter of the first mobile communications device 12. Alternatively, the electronic processor 16 may disable transmitting via the transceiver 26. In another exemplary embodiment, the mitigation action may include the electronic processor 16 changing the operating frequency band of the first mobile communications device 12 such that it does not conflict with the frequency band of the second mobile communications device 14. For example, the first mobile communications device 12 may be configured to operate on more than one communications network, using more than one frequency band. In such cases, the mitigation action may be to cause the electronic processor 16 to control the transceiver 26 to operate on a network that will not, or is less likely to, cause a conflict. In some embodiments, the interference message includes more than one mitigation action.

At block 108, the electronic processor 16 displays the interference message on the display screen 22. In certain embodiments, displaying the interference message includes displaying the information that a conflict exists and the proposed mitigation action, and prompting the user of the first mobile communications device 12 whether to take the mitigation action. In embodiments where the interference message includes more than one mitigation action, displaying the interference message may include displaying a prompt with selectable options as to the mitigation actions to take. The interference message may be displayed using graphics, text, or a combination of the two. Displaying the interference message may be accompanied by a sound, vibration, flashing indicator light, or some other means of alerting a user of the first mobile communications device 12 to the interference message. In some embodiments, the interference message may be an alert that represents a mitigation action suggestion, such as an audio message (for example, a sequence of sounds or a voice message), or a haptic alert (for example, a sequence of vibrations).

At block 110, the electronic processor 16 determines whether a predetermined time period has elapsed. The predetermined time period is a period of time, during which the electronic processor 16 will continue checking for input, for example, from a user of the first mobile communications device 12, received via the input/output interface 20, in response to the interference message. When the time period has not elapsed, the electronic processor 16 checks for input, at block 112. The electronic processor 16 continues to check whether the predetermined time period has elapsed or input has been received, at blocks 110 through 112, until one or the other is true.

When the predetermined time period has elapsed, the electronic processor 16 takes a mitigation action by issuing a command to the transceiver 26, at block 114. When an input is received before the predetermined time period has expired, the electronic processor 16 determines whether to take a mitigation action, at block 116. When the input indicates that the mitigation action should be taken, then the electronic processor 16 takes the mitigation action by issuing a command to the transceiver 26, at block 114. When the input indicates that the mitigation action should not be taken, then the electronic processor 16 takes no action, and the method 100 begins again with receiving a frequency message at block 102.

Returning now to block 114, when the electronic processor 16 determines that the mitigation action should be taken, it issues a command to the transceiver 26 based on the mitigation action. For example, the electronic processor 16 may issue a command to the transceiver 26 to enter an "airplane mode" (that is, to cease transmitting). In another example, the electronic processor 16 may issue a command to the transceiver 26 to begin using a different frequency band, if available. When more than one mitigation action is displayed in the interference message, the command is based on which mitigation action, if any, the user selects. When more than one mitigation action is displayed in the interference message, but no input is received, the electronic processor 16 issues a command based on the mitigation action most likely to eliminate the radiofrequency interference (for example, ceasing transmission).

In some embodiments, at block 118, the electronic processor 16 receives a confirmation from the transceiver 26 that the command issued at block 114 has been completed. In alternative embodiments, the command is executed by the transceiver 26 without a confirmation being sent to the electronic processor 16.

In some embodiments, the electronic processor 16 generates an alert, at block 120. The alert may include displaying graphics or text, playing a sound, causing a vibration, flashing an indicator light, some combination of the foregoing, or another means of alerting a user of the first mobile communications device 12 that the mitigation action will be taken. In some embodiments, the alert is generated in response to the confirmation received at block 118, and it alerts the user of the first mobile communications device 12 that the mitigation action has successfully executed.

Figure 3:
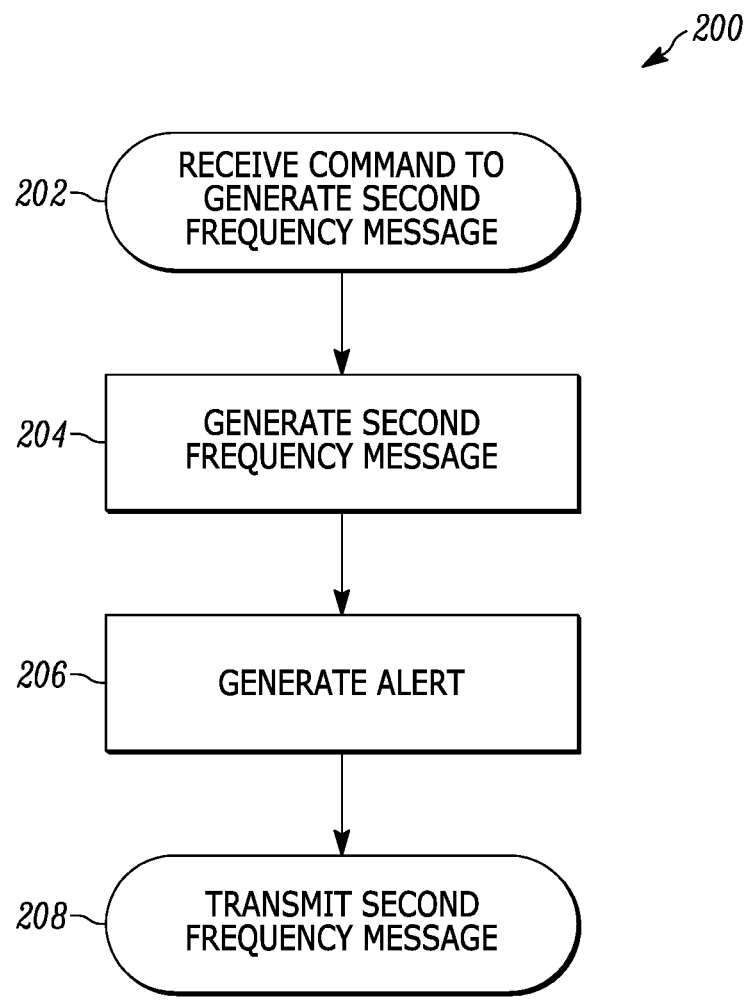
FIG. 3 is a flowchart of a method for reducing radiofrequency interference in a mobile communications device in accordance with some embodiments.

FIG. 3 illustrates an exemplary method 200 for reducing radiofrequency interference in a mobile communications device. As an example, the method 200 is described in terms of the first mobile communications device 12. This should not be considered limiting. The method 200 is also applicable to the second mobile communications device 14, or other similar devices. As described below, the method 200 may be used by the first mobile communications device 12 and the second mobile communications device 14 to produce a second frequency message, which may be received and processed using the method 100 described above. Exemplary embodiments of the first mobile communications device 12 and the second mobile communications device 14 may implement one or more of the methods described herein.

At block 202, the electronic processor 16 receives a command to generate a second frequency message. In some embodiments, the command is generated from an input received from the input/output interface 20. In other embodiments, the second frequency message is generated periodically (for example, every 5 minutes), and the command results from the expiration of a predetermined period. In other embodiments, the command is an indication from the transceiver 26, or from a transmitter of the first mobile communications device 12, that its operating frequency band has changed.

At block 204, the electronic processor 16 generates the second frequency message. The second frequency message includes, at least, the operating frequency band of the first mobile communications device 12. The second frequency message may include other information, as described above with respect to the generation of the frequency message using the method 100. At block 206, the electronic processor 16 generates an alert. The alert may include displaying graphics or text, playing a sound, causing a vibration, flashing an indicator light, some combination of the foregoing, or another means of alerting a user of the first mobile communications device 12, that the second frequency message has been created. In some embodiments, for example, where the second frequency message is generated without input, the alert is not generated.

At block 208, the electronic processor 16 transmits the second frequency message to the second mobile communications device 14, via the data link 30.

It should be noted that the systems and methods described herein are not limited to the first mobile communications device 12 and the second mobile communications device 14 each communicating wirelessly according to a single wireless communications modality. The methods described herein may also be implemented using communications devices that integrate two or more wireless modalities. For example, as can be appreciated by one skilled in the art, either or both of the first mobile communications device 12 and the second mobile communications device 14 may be configured to operate using both long-term evolution and land-mobile radio networks.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for reducing radiofrequency interference in a mobile communications device, the method comprising:
receiving, by a first mobile communications device, a frequency message including a frequency band of a second mobile communications device;
determining, by an electronic processor of the first mobile communications device, whether the frequency band of the second mobile communications device conflicts with an operating frequency band of the first mobile communications device;
generating, by the electronic processor of the first mobile communications device, an interference message, including a proposed mitigation action, when the frequency band of the second mobile communications device conflicts with the operating frequency band of the first mobile communications device;
displaying, on a screen of the first mobile communications device, the interference message;
receiving, within a predetermined time period by the electronic processor of the first mobile communications device, a user input in response to the interference message;
in response to receiving the user input, issuing, by the electronic processor of the first mobile communications device, a command to a transceiver of the first mobile communications device to execute the proposed mitigation action; and
when the predetermined time period has elapsed without receiving the user input, issuing, by the electronic processor of the first mobile communications device, the command to a transceiver of the first mobile communications device to execute the proposed mitigation action;
wherein the frequency band is one of group consisting of a long-term evolution frequency band and a land-mobile radio frequency band; and
wherein the operating frequency band is one of group consisting of a long-term evolution frequency band and a land-mobile radio frequency band.

2. The method of claim 1, further comprising:
receiving, by the electronic processor of the first mobile communications device, a confirmation based on the command; and
generating, by the electronic processor of the first mobile communications device, an alert based on the confirmation.

3. The method of claim 1, wherein the proposed mitigation action is one selected from the group consisting of powering down a transmitter of the first mobile communications device and changing the operating frequency band of the first mobile communications device such that it does not conflict with the frequency band of the second mobile communications device.

4. The method of claim 1, wherein receiving the frequency message includes receiving the frequency message via a wired connection with the second mobile communications device.

5. The method of claim 1, wherein receiving the frequency message includes receiving the frequency message via a wireless connection with the second mobile communications device, via a receiver of the first mobile communications device.

6. The method of claim 1, further comprising:
receiving, by the electronic processor of the first mobile communications device, a command to generate a second frequency message;

generating, by the electronic processor of the first mobile communications device, in response to the command, the second frequency message including the operating frequency band of the first mobile communications device;

generating, by the electronic processor, an alert based on the second frequency message; and transmitting, to the second mobile communications device, the second frequency message.

7. The method of claim 6, wherein the command is based on at least one selected from a group consisting of an input, a predetermined period, and an indication from a transmitter of the first mobile communications device.

8. A mobile communications device, the device comprising:

a screen;

a transceiver having an operating frequency band;

an electronic processor electrically coupled to the transceiver and the screen and configured to receive a frequency message including a frequency band of a second mobile communications device;

determine whether the frequency band of the second mobile communications device conflicts with the operating frequency band;

generate an interference message, including a proposed mitigation action, when the frequency band of the second mobile communications device conflicts with the operating frequency band;

display, on the screen, the interference message;

receive a user input in response to the interference message;

in response to receiving the user input within a predetermined time period, issue a command to the transceiver to execute the proposed mitigation action; and when the predetermined time period has elapsed without receiving the user input, issue the command to a transceiver of the first mobile communications device to execute the proposed mitigation action;

wherein the frequency band is one of group consisting of a long-term evolution frequency band and a land-mobile radio frequency band; and wherein the operating frequency band is one of group consisting of a long-term evolution frequency band and a land-mobile radio frequency band.

9. The device of claim 8, wherein the electronic processor is further configured to:

receive a confirmation from the transceiver based on the command; and generate an alert based on the confirmation.

10. The device of claim 8, further comprising:

a transmitter;

wherein the electronic processor electrically is electrically coupled to the transmitter and wherein the proposed mitigation action is one selected from the group consisting of powering down the transmitter and changing the operating frequency band of the first mobile communications device such that it does not conflict with the frequency band of the second mobile communications device.

11. The device of claim 8, further comprising:

a wired communications interface;

wherein the electronic processor is electrically coupled to the wired communications interface; and wherein receiving the frequency message includes receiving the frequency message via the wired communications interface.

12. The device of claim 8, further comprising:

a receiver;

wherein the electronic processor is electrically coupled to the receiver; and wherein receiving the frequency message includes receiving the frequency message via a wireless connection with the second mobile communications device, via the receiver.

13. The device of claim 8, wherein the electronic processor is further configured to receive a command to generate a second frequency message;

generate, in response to the command, the second frequency message including the operating frequency band of the first mobile communications device;

generating, by the electronic processor, an alert based on the second frequency message; and transmitting, to the second mobile communications device, the second frequency message.

14. The device of claim 13, wherein the command is based on at least one selected from a group consisting of an input, a predetermined period, and an indication from a transmitter of the first mobile communications device.

* * * * *